United States Patent
Ichinose et al.

(10) Patent No.: US 7,212,244 B2
(45) Date of Patent: *May 1, 2007

(54) FOCAL PLANE SHUTTER APPARATUS

(75) Inventors: Shuji Ichinose, Koriyama (JP); Takao Ogawa, Koriyama (JP); Yutaka Okazaki, Koriyama (JP)

(73) Assignee: Nidec Copal Corporation, Tokyo (JP)

( * ) Notice: Subject to any disclaimer, the term of this patent is extended or adjusted under 35 U.S.C. 154(b) by 729 days.

This patent is subject to a terminal disclaimer.

(21) Appl. No.: 10/280,089

(22) Filed: Oct. 25, 2002

(65) Prior Publication Data

US 2003/0128976 A1    Jul. 10, 2003

(30) Foreign Application Priority Data

| Oct. 25, 2001 | (JP) | ............................. 2001-327692 |
| May 7, 2002 | (JP) | ............................. 2002-131154 |
| Jun. 27, 2002 | (JP) | ............................. 2002-187881 |

(51) Int. Cl.
*H04N 5/238*  (2006.01)
*G03B 9/40*  (2006.01)

(52) U.S. Cl. ........................ 348/367; 396/487; 348/374

(58) Field of Classification Search ................ 348/367; 396/487

See application file for complete search history.

(56) References Cited

U.S. PATENT DOCUMENTS 5,664,247 A * 9/1997 Hasuda et al. .............. 396/456
6,474,880 B2 * 11/2002 Toyoda et al. .............. 396/486
6,805,500 B2 * 10/2004 Miyazaki ..................... 396/484
2004/0042787 A1 * 3/2004 Miyazaki ..................... 396/484
2004/0213561 A1 * 10/2004 Ichinose et al. ............ 396/487

FOREIGN PATENT DOCUMENTS

| JP | 11-064925 | 3/1999 |
| JP | 2001-157087 | 6/2001 |
| JP | 2001-298640 | 10/2001 |
| JP | 2001-311997 | 11/2001 |
| JP | 2002-010137 | 1/2002 |
| JP | 2002-156685 | 5/2002 |

* cited by examiner

*Primary Examiner*—Ngoc-Yen Vu
*Assistant Examiner*—Nicholas G. Giles
(74) *Attorney, Agent, or Firm*—Roberts, Mlotkowski & Hobbes; Thomas W. Cole

(57) ABSTRACT

A focal plane shutter apparatus is constructed by a light shielding blade, a fitting pin attached to the blade and an arm which is slidably engaged with the fitting pin to open or close the blade. A surface hardness of the fitting pin is higher than that of the arm. Concretely, the surface hardness of the arm is Hv300 to 600, and the surface hardness of the fitting pin is Hv450 to 1000. The arm and the fitting pin are subjected to chemical polishing treatment. Furthermore, the fitting pin is plated with nickel, chromium, palladium or rhodium. The fitting pin and arm have a substantially equal material hardness, or the material hardness of the fitting pin is higher. As the case may be, the fitting pin or arm may be plated with gold. Such an arrangement can suppress generation and accumulation of abrasion powder in the focal plane shutter apparatus assembled into a digital camera.

7 Claims, 6 Drawing Sheets

FIG. 2

| NO | TREATMENT OF FITTING PIN | JUDGMENT | |
|----|--------------------------|----------|---|
| 1 | SUS416BFS | ×(E) | 10~30μm ABRASION POWDER MAINLY OF SUS FITTING PIN |
| 2 | SUS416BFS + THERMAL TREATMENT | △(D) | 10~30μm ABRASION POWDER MAINLY OF SUS FITTING PIN |
| 3 | SUS416BFS + THERMAL TREATMENT + CHEMICAL NICKEL PLATING + DEPOSITION HARDENING TREATMENT | ○△(C) | 30~50μm ABRASION POWDER MAINLY OF Ni PLATING |
| 4 | SK4 + THERMAL TREATMENT + BLACK DYEING TREATMENT | ×(E) | 10~40μm Fe, Cr DETECTED |
| 5 | SK4 + THERMAL TREATMENT + CHEMICAL POLISHING + BLACK DYEING TREATMENT | △(D) | 10~30μm Fe, Cr DETECTED |
| 6 | SK4 + THERMAL TREATMENT + Cr PLATING | △(D) | 40μm OR LESS Fe, Cr DETECTED |
| 7 | SK4 + THERMAL TREATMENT + CHEMICAL POLISHING + Cr PLATING | ○(B) | 10~20μm Fe, Cr DETECTED |
| 8 | SK4 + THERMAL TREATMENT + Pd PLATING | ○(B) | 15μm OR LESS Pd, Fe, Ni DETECTED |
| 9 | SK4 + THERMAL TREATMENT + CHEMICAL POLISHING + Pd PLATING | ◎(A) | 10μm OR LESS METAL COMPONENT IS NOT DETECTED, MAINLY DUST |

FIG. 3

| NO | TREATMENT OF FITTING PIN | JUDGMENT | DURABILITY TEST RESULT |
|---|---|---|---|
| 1 | SUS416BFS<br>+ HARDENING<br>+ BLACK DYEING | ×(E) | 10 μm OR MORE METAL ABRASION POWDER GENERATED ABRASION POWDER MAINLY OF SUS FITTING PIN |
| 2 | SK4<br>+ CHEMICAL POLISHING<br>+ Au PLATING | ◎(A) | 10 μm OR LESS METAL ABRASION POWDER |
| 3 | SUS416BFS<br>+ HARDENING<br>+ CHEMICAL POLISHING<br>+ Au PLATING | ◎(A) | 10 μm OR LESS METAL ABRASION POWDER |

FIG. 4

| NO | TREATMENT OF ARM | TREATMENT OF FITTING PIN | JUDGMENT | AFTER DURABILITY TEST |
|---|---|---|---|---|
| 1 | SK4<br>+ BLACK DYEING | SUS416BFS<br>+ HARDENING<br>+ BLACK DYEING | ×(E) | 10 μm OR MORE<br>METAL ABRASION POWDER GENERATED<br>ABRASION POWDER MAINLY OF SUS FITTING PIN |
| 2 | SK4<br>+ CHEMICAL POLISHING<br>+ Au PLATING | SUS416BFS<br>+ HARDENING<br>+ CHEMICAL POLISHING | O(B) | 10 μm OR LESS<br>METAL ABRASION POWDER GENERATED |

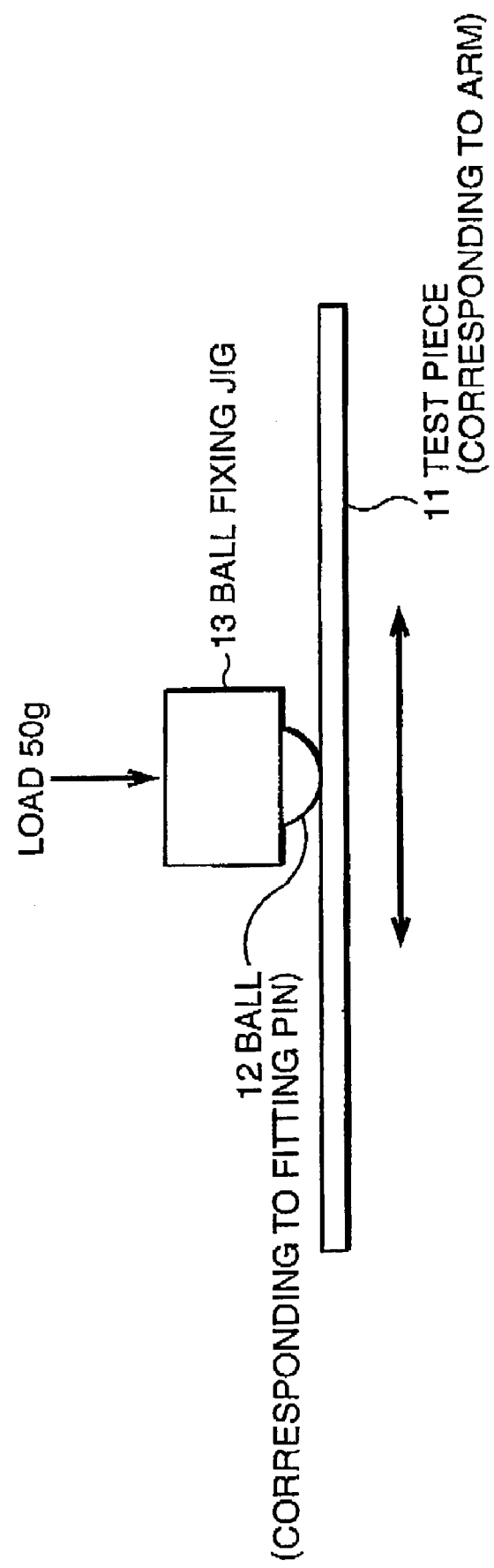

FIG. 6

| TEST PIECE \ BALL | SUJ-2 | SUS304 | Pd/SUJ-2 | Au/SUJ-2 | Ni/SUJ-2 |
|---|---|---|---|---|---|
| FBC/SK | △(D) | △(D) | ○(B) | ○(B) | △(D) |
| Pd/SPCC | ×(E) | ×(E) | ×(E) | ○(B) | ×(E) |
| Au/SPCC | ◎(A) | ◎(A) | △(D) | △(D) | △(D) |
| Ni/SPCC | △(D) | △(D) | △(D) | △(D) | △(D) |

FOCAL PLANE SHUTTER APPARATUS

BACKGROUND OF THE INVENTION

1. Technical Field of the Invention

The present invention relates to a focal plane shutter apparatus, more concretely to a focal plane shutter apparatus which is assembled particularly in a digital camera and in which an amount of abrasion powder generated by the sliding of components is reduced as much as possible.

2. Related Art

A focal plane shutter apparatus includes a plurality of light shielding blades, a fitting pin caulked or otherwise integrally attached to each blade, and an arm which is slidably engaged with the fitting pin to open or close each blade.

When the blades are opened and closed, the arm and fitting pin frictionally slides with each other and abrasion powder is generated. In a conventional camera using a silver film, the film is wound up every exposure operation, and therefore even the above-described abrasion powder generated in the focal plane shutter apparatus assembled in the camera is not accumulated. However, in a digital camera, image pickup devices such as CCD used instead of the silver film are fixed. When the focal plane shutter apparatus assembled in the digital camera is repeatedly driven, the abrasion powder is generated by the rubbing of the arm and fitting pin with the open or close operation of the blades. When the abrasion powder is accumulated in an image frame, image quality is lowered, and this is a problem to be solved.

It is to be noted that several abrasion powder countermeasures have heretofore been proposed. For example, in Japanese Patent Application Laid-Open No. 2001-157087, an image pickup apparatus has been proposed which includes a dust mode indicating foreign materials on the CCD and a cleaning mode for cleaning the foreign materials. These modes can quickly be switched. When the foreign materials on the CCD are detected and indicated in the dust mode, the mode quickly shifts to the cleaning mode, and a cleaning operation can be performed.

In Japanese Patent Application Laid-Open No. 2001-311997, an electronic camera has been proposed in which an optical low pass filter is inserted between a focal plane shutter and an image pickup device. This low pass filter prevents an image quality from being deteriorated by the abrasion powder generated from the focal plane shutter.

Further in Japanese Patent Application Laid-Open No. 2002-10137, an electronic camera has been proposed in which the low pass filter can be moved during an exposure operation. Even when dust is attached to the low pass filter, the filter is moved during the exposure operation, the shadow of the dust is dispersed into a plurality of pixels, and the quality of the image obtained by the image pickup device is inhibited from being deteriorated. However, any of these abrasion powder countermeasures is devised on the fact that the abrasion powder is generated, and is not a fundamental countermeasure to suppress the abrasion powder itself.

SUMMARY OF THE INVENTION

An object of the present invention is to provide a focal plane shutter apparatus in which the generation of the abrasion powder can effectively be inhibited.

To solve the above-described conventional technical problem, the following means is taken. That is, according to a first aspect of the present invention, there is provided a focal plane shutter apparatus comprising a light shielding blade, a fitting pin attached to the blade, and an arm which is slidably engaged with the fitting pin to open or close the blade, wherein a surface hardness of the fitting pin is higher than that of the arm. Preferably, the surface hardness of the arm is Hv300 to Hv600 and the surface hardness of the fitting pin is Hv450 to Hv1000. Preferably, the arm and fitting pin are subjected to chemical polishing treatment. Preferably, the fitting pin is plated with nickel, chromium, palladium or rhodium. Preferably, a material hardness of the fitting pin and the arm is substantially equal, or the material hardness of the fitting pin is higher.

According to a second aspect of the present invention, there is provided a focal plane shutter apparatus comprising a light shielding blade, a fitting pin attached to the blade, and an arm which is slidably engaged with the fitting pin to open or close the blade, wherein a material hardness of said fitting pin is equal to or higher than that of said arm. Moreover, the arm and fitting pin are subjected to chemical polishing treatment. Furthermore, the fitting pin is plated with gold.

According to a third aspect of the present invention, there is provided a focal plane shutter apparatus comprising a light shielding blade, a fitting pin attached to the blade, and an arm which is slidably engaged with the fitting pin to open or close the blade, wherein a material hardness of said fitting pin is equal to or higher than that of said arm, the arm and fitting pin are subjected to chemical polishing treatment, and the arm is plated with gold. Moreover, a surface hardness of the fitting pin is higher than that of the arm.

As a result of inspection of foreign materials accumulated in an image frame of a digital camera using image pickup devices such as CCD, and as a result of durability test, it has been found that these foreign materials are abrasion powder generated from a conventional focal plane shutter apparatus. The abrasion powder has a particle diameter of about several tens of micrometers, and it has been found that a considerable amount of powder is generated. A survey of a generation source has revealed that a large amount of abrasion powder is generated by an frictional slide between a notch portion of a connection arm, and a blade fitting pin. Thus, according to the first aspect of the present invention, as a result of various studies of a combination of material/surface treatment by which the abrasion powder is not easily generated by the frictional slide, for the arm, a material having Hv (Vickers hardness) in the range of 300 to 500 is used, burrs generated by press-cutting are removed by the chemical polishing, and the arm is subjected to a predetermined thermal treatment, so that the surface hardness is about Hv300 to 600. On the other hand, for the fitting pin attached to the blade, a material having a range of Hv300 to 500 is used, and the material is subjected to a thermal treatment or surface plating, so that the surface hardness of the fitting pin may be set to about Hv450 to 1000. For example, with a hard chromium plating the hardness is Hv700 to 800, with a chemical nickel plating the hardness is Hv500 to 600, with a palladium plating the hardness is Hv450 to 550, and rhodium plating is Hv800 to 900. Alternatively, if necessary, the chemical polishing may be performed before the plating so as to remove the burrs generated in a preprocess of the fitting pins. When the surface hardness of the fitting pin side is set to be higher than the surface hardness of the arm, it is possible to inhibit the abrasion of the fitting pin and reduce the generation of the abrasion powder, which would deteriorate the image quality of a digital camera. Moreover, it is preferable from a viewpoint of the reduction of the abrasion powder that the material hardness of the arm and fitting pin is substantially equal or the fitting pin side is harder. It is to be noted that the Vickers hardness Hv is a hardness measure obtained by a Vickers hardness tester as a type of an indentation hardness tester. A static load is applied to a diamond indenter having a regular quadrangular pyramid shape in which an angle between opposite faces is 136 degrees and the hardness is tested. A degree of hardness is determined by a quotient obtained by dividing a surface area of an indentation made by pressing the indenter onto a measurement surface by the load. This hardness measure is referred to as the Vickers hardness Hv.

Moreover, according to the second aspect of the present invention, for the arm, the material having Hv of 300 to 500 is used, and the burrs generated by press-cutting are removed from the arm provisionally by the chemical polishing. On the other hand, for the fitting pin attached to the blade, the material having the range of Hv300 to 500 is used, and the burrs generated in the preprocessing of the pins are removed by the chemical polishing. Examples of the burrs include slices left when a raw material is shaped into the arm or fitting pin by pressing. Furthermore, after the burrs are removed by the chemical polishing, the fitting pin is plated with gold. The fitting pin is plated with gold so that ductility and lubricating properties are imparted to the surface. Thereby, it is possible to inhibit the abrasion of the fitting pin and to reduce the generation of the abrasion powder, which would cause the image quality deterioration of the digital camera.

Furthermore, according to the third aspect of the present invention, for the arm, the material having Hv of 300 to 500 is used, the burrs generated by press-cutting are removed by the chemical polishing, and the arm is further plated with gold. With the gold plating, the surface hardness of the arm becomes Hv50 to 80. For the fitting pin, the material having the range of Hv300 to 500 is used, and the burrs generated in the preprocessing are removed by the chemical polishing. Examples of the burrs include the slices left when the raw material is shaped into the fitting pin by pressing. The arm, which is a sliding part, is plated with gold so that ductility and smooth sliding properties are imparted. On the other hand, for the fitting pin which is a fixed side, the material having a surface hardness higher than that of the arm is used. Thereby, it is possible to inhibit the abrasion between the components and to reduce the generation of the abrasion powder, which would cause the image quality deterioration.

BRIEF DESCRIPTION OF THE DRAWINGS

FIG. 2 is a table diagram showing a durability test result of the focal plane shutter apparatus according to a first embodiment of the present invention.

FIG. 3 is a table diagram showing a durability test result of the focal plane shutter apparatus according to a second embodiment of the present invention.

FIG. 4 is a table diagram showing a durability test result of the focal plane shutter apparatus according to a third embodiment of the present invention.

FIG. 5 is a schematic diagram showing a method of a sliding test.

FIG. 6 is a table diagram showing a sliding test result.

DETAILED DESCRIPTION OF THE INVENTION

Figure 1A:
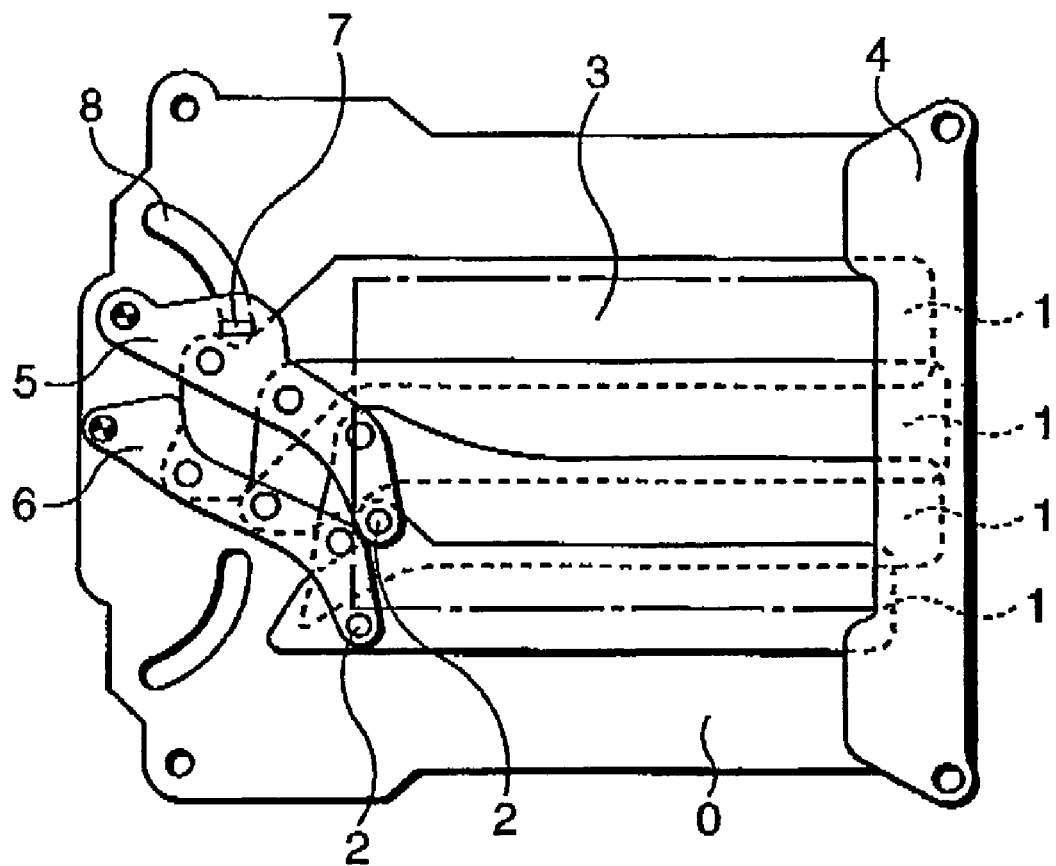
FIGS. 1A and 1B are a schematic diagram showing a focal plans shutter apparatus according to the present invention.
Figure 1B:
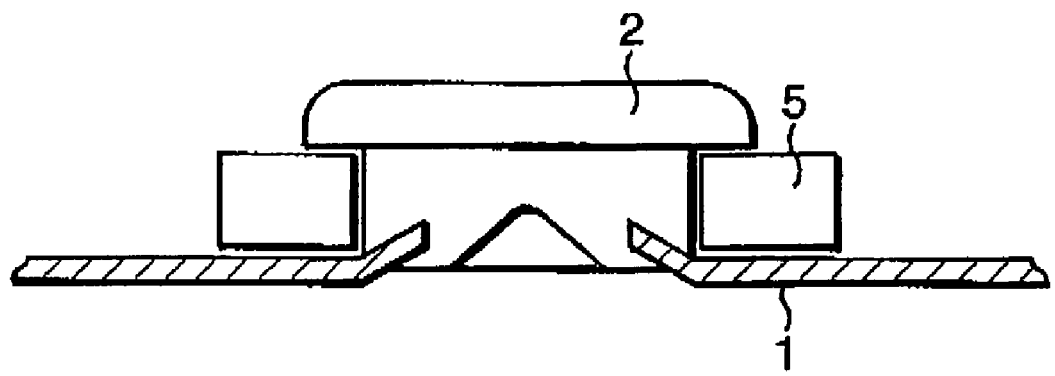

Embodiments of the present invention will be described hereinafter in detail with reference to the drawings. FIG. 1 is a schematic diagram schematically showing a focal plane shutter apparatus according to first, second, and third embodiments of the present invention. FIG. 1A is a plan view, and FIG. 1B is a sectional view of the major part thereof. As shown in FIG. 1A, the present focal plane shutter apparatus is assembled using a shutter substrate 0. A rectangular opening 3 (shown by a one-dot chain line) is formed in a middle portion of the shutter substrate 0. In a resting state, four front blades 1 partially overlap with one another so that the shutter opening 3 is closed. As not shown, a rear blade group is overlapped and disposed below the front blade group. An unnecessary movement of the tip end of each shutter blade 1 is restricted by a blade press 4. Pins 2 formed of a metal are caulked or otherwise integrally attached to a root portion of each shutter blade 1. A pair of arms 5 and 6 are rotatably supported on a left end of the substrate 0, while keeping a mutual parallel relationship. The root portion of each front blade 1 is engaged with the arms 5 and 6 via the fitting pins 2. The rear blade group is similarly engaged with a pair of arms (not shown). The main arm 5 includes an elongated hole 7, and a long groove 8 is formed in the substrate 0 along a movement track of the elongated hole 7 with the rotation of the main arm 5. It is to be noted that a driving pin (not shown) extending through the substrate 0 is fitted into the elongated hole 7 via the groove 8. When a shutter release button (not shown) is pressed, the driving pin moves upwards by an urging force given along the elongated groove 8 formed in the substrate 0. Accordingly, the main arm 5 engaged with the driving pin in the elongated hole 7 and the connected sub arm 6 rotate and move upwards. By this rotation, the front blades 1 vertically run upwards, and open the opening 3. Subsequently, the rear blade group (not shown) vertically runs to close the opening 3 so that exposure ends.

[First Embodiment]

As shown in FIG. 1B, the pin 2 is caulked or otherwise integrally attached to the blade 1. The arm 5 is slidably engaged with the fitting pin 2 to open or close the blade 1. In such a constitution, the surface hardness of the fitting pin 2 is higher than the surface hardness of the arm 5. There is a possibility that an outer peripheral portion of the fitting pin 2 and an inner peripheral portion of a through-hole for engagement formed in the arm 5 frictionally slide on each other and abrasion powder is generated. In the first embodiment of the present invention, an outer peripheral surface hardness of the fitting pin 2 is higher than an inner peripheral surface hardness of the through-hole or notch formed in the arm 5. This can inhibit the generation of the abrasion powder. Concretely, the surface hardness on the arm 5 side is about HV300 to 600, whereas the surface hardness of the fitting pin 2 on the blade 1 side is set to about Hv450 to 1000. It is to be noted that the arm 5 and fitting pin 2 are subjected to chemical polishing treatment beforehand, and burrs possibly causing the generation of the abrasion powder and generated in a preprocessing are preferably removed beforehand.

Particularly for the fitting pin 2, in order to enhance the surface hardness, the pin is preferably plated with nickel, chromium, palladium or rhodium. Moreover, the material hardness of the fitting pin 2 and arm 5 is substantially equal or the material hardness of the fitting pin 2 is preferably higher.

Different materials were used, different surface and thermal treatments were performed, and nine types of samples of fitting pins were prepared. These fitting pin samples were assembled into the focal plane shutter apparatus shown in FIG. 1, 30000 open and close operations were performed, and durability tests were carried out. A generated amount and particle diameter of the abrasion powder generated as a result were inspected. Results are shown in a table of FIG. 2. For the generated amount of the abrasion powder, a qualitative judgment was performed, and judgment results were represented by symbols such as X(E), Δ(D), ○(B), ⊙(A). Nine types of samples were used to perform a relative evaluation, X(E) mark was put on the sample having a largest abrasion powder generated amount, Δ(D), ○Δ(C), ○(B) were used in order, and ⊙(A) mark was put on the sample having a smallest abrasion powder generated amount. It is to be noted that SK4-CSP defined by Japanese Industrial standards (JIS) is used for the arm, which is engaged with the fitting pin. SK4-CSP is a cold-rolled steel band for a spring. This arm is subjected to chemical polishing and further to a black dyeing treatment. The chemical polishing treatment comprises the steps of immersing a metal component processed beforehand in an arm shape into a chemical polishing solution, and dissolving the surface to remove the burrs. A dimension change by the chemical polishing is a loss of about 1 to 2 μm. As the chemical polishing solution, CPL-100 manufactured by Mitsubishi Gas Chemical Co., Inc. is used, and an immersion time is about ten seconds at room temperature. Moreover, the black dyeing treatment comprises the steps of immersing an iron and steel component into a strong alkali aqueous solution at high temperature, and forming a black oxide film of iron oxide ($Fe_3O_4$). Furthermore, when a chromate treatment by chromic anhydride or potassium bichromate is additionally used, corrosion resistance is enhanced, and this material is broadly used in components requiring reflection prevention such as camera components. The present embodiment includes these treatments.

Sample 1 is a fitting pin using SUS416BFS as a material. This material is a rod defined by JIS standard SUS416 among free-cutting stainless steel rods. When Sample 1 underwent 30000 times of operation tests, a large amount of abrasion powder was generated and judgment was X(E). The abrasion powder has a particle diameter of 10 to 30 μm, and a most part of the powder was generated from stainless steel as the material of the fitting pin. The material SUS416 of the fitting pin has a hardness lower than that of material SK4 of the arm.

Sample 2 uses SUS416BFS as the material similarly as Sample 1, and this was subjected to a thermal treatment such as a hardening/tempering treatment. By the thermal treatment, the Vickers hardness of the fitting pin was set to about Hv350 to 450. The fitting pin of Sample 2 underwent 30000 times durability tests, the generated amount of abrasion powder was judged as Δ(D), and it was found that the sample 2 was improved as compared with Sample 1. The abrasion powder was generated mainly from stainless steel as the material of the fitting pin, and has a particle diameter of 10 to 30 μm.

Sample 3 was obtained by subjecting the fitting pin of Sample 2 further to a chemical nickel (Ni) plating and a deposition hardening treatment as one type of the thermal treatment. The thickness of the chemical nickel plating was set to 2.5 μm. By the chemical nickel plating, the hardness rises to Hv500 to 600. The result of the durability test is ○Δ(C), and the generated amount of the abrasion powder is reduced as compared with Sample 2. This is supposed mainly because the surface hardness is improved by the chemical nickel plating. It is to be noted that according to analysis the abrasion powder is mainly a peeled nickel plating, and has a particle diameter of 30 to 50 μm.

For Sample 4, the same material SK4 as that of the arm was used as the material of the fitting pin instead of SUS416, and this was subjected to the thermal and black dyeing treatments. The Vickers hardness was set to about Hv350 to 450 by the thermal treatment. When 30000 times durability tests were carried out, a relatively large amount of abrasion powder was generated, and the judgment result was X(E). The abrasion powder has a particle diameter of 10 to 40 μm, and Fe, Cr, and the like were detected.

Sample 5 was obtained by adding the chemical polishing treatment to Sample 4. By the chemical polishing treatment the surface of the fitting pin became smooth. When the durability test was performed, the generated amount of abrasion powder was reduced as compared with Sample 4, and the judgment result was Δ(D). When the abrasion powder was analyzed, the particle diameter was 10 to 30 μm, and Fe, Cr were detected.

Sample 6 was subjected to a chromium (Cr) plating instead of the black dyeing treatment performed in Sample 4. When a hard chromium plating is performed, the Vickers hardness reaches Hv700 to 800. The durability test result was Δ(D), and it was found that the abrasion powder was reduced as compared with Sample 4. When the abrasion powder was analyzed, the particle diameter was 40 μm or less, and Fe, Cr were detected.

Sample 7 is a fitting pin obtained by adding the chemical polishing further to the treatment of Sample 6. It has been found that the durability test result is ○(B), and the generated amount of abrasion powder is further reduced. When the abrasion powder was analyzed, the particle diameter was 10 to 20 μm, and Fe, Cr were detected.

Sample 8 is subjected to a palladium (Pd) plating instead of the black dyeing treatment of Sample 4. When the palladium plating is performed, the surface hardness is about Hv450 to 550. The durability test result was ○(B). When the abrasion powder was analyzed, the particle diameter was 15 μm or less, and Pd, Fe, Ni were detected.

Lastly, Sample 9 is obtained by adding the chemical polishing further to Sample 8. The result of 30000 times durability tests was ⊙(A), and the amount of abrasion powder was smallest. When the abrasion powder was analyzed, the particle diameter was 10 μm or less, any metal component was not detected, and the powder was mainly dust floating in air. Moreover, a rhodium plating has a hardness higher than that of the palladium plating, and further effect is anticipated. As described above, SK4 (Hv300 to 500) is used as the material of the arm, the material (e.g., SK4) having a hardness substantially equal to or higher than that of the arm is used as the material of the blade fitting pin, and the material is further subjected to the chemical polishing or plating treatment, so that the abrasion powder generated from the fitting pin can be reduced.

[Second Embodiment]

In order to inhibit the generation of harmful abrasion powder, in a second embodiment of the present invention, the following countermeasure is taken in material and processing aspects. First, the material hardness of the fitting pin 2 and arm 5 is substantially equal or the material hardness of the fitting pin 2 is higher. Basically, when the material hardness of the fitting pin 2 and arm 5 is set to be substantially equal, it is possible to inhibit the abrasion of either component from proceeding. As the case may be, even when the material hardness of the arm 5 is higher than the material hardness of the fitting pin 2, the abrasion powder is effectively reduced. Much abrasion powder has heretofore been generated on the fitting pin side. Therefore, the material hardness of the fitting pin side may be set to be substantially equal to or higher than the material hardness of the arm side. Secondly, the arm 5 and fitting pin 2 are subjected to the chemical polishing treatment beforehand, and the burrs which possibly causes the generation of the abrasion powder and which are generated in the preprocessing such as the pressing are removed. Thereby, the generation of the abrasion powder can further be reduced. Thirdly, the fitting pin 2 is plated with gold, so that the ductility and lubricating properties are imparted to the surface. This inhibits the abrasion of the surface of the fitting pin 2. When the above-described three countermeasures are combined, it has been possible to reduce the generation of the abrasion powder causing the image quality deterioration as much as possible.

The different materials were used, different surface and thermal treatments were performed, and three types of samples of fitting pins were prepared. These fitting pin samples were assembled into the focal plane shutter apparatus shown in FIG. 1, 30000 times of open and close operations were performed, and durability tests were carried out. The generated amount and particle diameter of the generated abrasion powder were inspected. Results are shown in a table of FIG. 3. For the generated amount of the abrasion powder, the qualitative judgment was performed, and judgment results were classified into four levels in accordance with the generated amount. In the table, Level E indicating a largest generated amount is marked with X(E), and Level A indicating a smallest generated amount is marked with ⊙(A).

It is to be noted that SK4-CSP defined by the JIS standards is used for the arm, which is engaged with the fitting pin. The SK4-CSP is a cold-rolled steel band for the spring, and the material hardness is about Hv300 to 500. This arm is subjected to the chemical polishing and further to the black dyeing treatment. The chemical polishing treatment comprises the steps of immersing the metal component processed beforehand in the arm shape into the chemical polishing solution, and dissolving the surface to remove the burrs. The dimension change by the chemical polishing is the loss of about 1 to 2 μm. As the chemical polishing solution, CPL-100 manufactured by Mitsubishi Gas Chemical Co., Inc. is used, and the immersion time is about ten seconds at room temperature. Moreover, the black dyeing treatment comprises the steps of immersing the iron and steel component into the strong alkali aqueous solution at high temperature, and forming the black oxide film of iron oxide ($Fe_3O_4$). Furthermore, when the chromate treatment by chromic anhydride or potassium bichromate is also used, corrosion resistance is enhanced, and this material is broadly used in components requiring reflection prevention such as the camera components. The present embodiment includes these treatments.

Sample 1 is a fitting pin using SUS416BFS as the material. This material is the rod defined by JIS standard SUS416 among the free-cutting stainless steel rods. Without any treatment, the material SUS416 of the fitting pin has a hardness lower than that of the material SK4 of the arm. For the present sample. SUS416BFS is subjected to a thermal treatment of hardening. By this thermal treatment, the Vickers hardness of the fitting pin is about Hv300 to 500. That is, the material hardness of hardened/treated SUS416BFS is substantially equal to that of the material SK4 of the arm. Depending on conditions of the hardening treatment, the material can be harder than SK4. Furthermore, this sample is subjected to the black dyeing treatment. As described above, this black dyeing treatment is broadly used for components requiring the reflection prevention such as the camera components. When Sample 1 subjected to such processing underwent 30000 times of the operation tests, a large amount of abrasion powder was generated and judgment was X(E). The abrasion powder has a particle diameter of 10 μm or more, and the most part was generated from the SUS fitting pin. The larger the particle diameter of abrasion powder is, the larger an influence on the image quality becomes. Particularly the abrasion powder having a particle diameter exceeding 10 μm exerts a large adverse influence on the image quality.

Sample 2 uses the same SK4 as the arm as the material of the fitting pin instead of SUS416BFS. The material hardness of SK4 is Hv300 to 500. It is to be noted that the Vickers hardness Hv is a hardness obtained by the Vickers hardness tester as one type of the indentation hardness tester. The static load is applied to the diamond indenter having the regular quadrangular pyramid shape in which the angle between opposite faces is 136 degrees and the hardness is tested. The degree of hardness is determined by the quotient obtained by dividing the surface area of the indentation made by pressing the indenter onto the measurement surface by the load. This hardness is referred to as the Vickers hardness Hv. For Sample 2, when SK4 is further subjected to the chemical polishing treatment, the surface of the fitting pin is smoothed. As described above, the chemical polishing treatment comprises the steps of immersing the metal component processed beforehand in a fitting pin shape into the chemical polishing solution, and dissolving the surface to remove the burrs. In addition, the surface of Sample 2 is plated with gold. The thickness is about 0.5 μm. As a result of 30000 times of the durability tests performed with respect to this sample, the generated amount of abrasion powder remarkably decreases as compared with Sample 1 and the result is marked with ⊙(A). Moreover, the particle diameter of a slight amount of generated abrasion powder is measured 10 μm or less. The judgment of the durability test indicates that the fitting pin of Sample 2 has a level suitable for the component of the shutter for the digital camera.

Sample 3 uses SUS416BFS subjected to the hardening treatment similarly as Sample 1 whose result was not satisfactory, but this is subjected to the chemical polishing and gold plating treatments similarly as Sample 2. When Sample 3 underwent the 30000 times durability tests, the generated amount of abrasion powder remarkably decreased as compared with Sample 1, and the judgment was ⊙(A). The particle diameter of a slight amount of generated metal abrasion powder is measured 10 μm or less. The result of the durability test indicates that Sample 3 has the level suitable for the component of the shutter for the digital camera.

[Third Embodiment]

In order to prevent the generation of harmful abrasion powder, in a third embodiment of the present invention, the following countermeasure is taken in the material and processing aspects. First, the material hardness of the fitting pin 2 and arm 5 is substantially equal or the material hardness of the fitting pin 2 is higher. Basically, when the material hardness of the fitting pin 2 and arm 5 is set to be substantially equal, it is possible to inhibit the abrasion of either component from proceeding. As the case may be, even when the material hardness of the arm 5 is higher than the material hardness of the fitting pin 2, the abrasion powder is effectively reduced. Much abrasion powder has heretofore been generated on the fitting pin side. Therefore, the material hardness on the fitting pin side may be set to be substantially equal to or higher than the material hardness on the arm side. Secondly, the arm 5 and fitting pin 2 are subjected to the chemical polishing treatment beforehand, and the burrs which possibly causes the generation of the abrasion powder and which are generated in the preprocessing such as the pressing are removed. Thereby, the generation of the abrasion powder can further be reduced. Thirdly, the arm 5 is plated with gold, so that the ductility and smooth sliding properties are imparted. By the gold plating, the surface hardness of the arm 5 is Hv50 to 80, and the surface hardness of the fitting pin not plated with gold is higher. The arm 5 on the sliding side is plated with gold so that the ductility and satisfactory sliding properties are imparted. On the other hand, the fitting pin 2 on the fixed side holds the surface hardness higher than that of the arm 5. This inhibits the abrasion of both the components. When the above-described three countermeasures are combined, it has been possible to reduce the generation of the abrasion powder causing the image quality deterioration as much as possible.

The different materials were used, different surface treatments were performed, and two types of samples of arms were prepared. These samples were assembled into the focal plane shutter apparatus shown in FIG. 1, 30000 times of open and close operations were performed, and durability tests were carried out. The generated amount and particle diameter of the abrasion powder generated as a result were inspected. Results are shown in a table of FIG. 4. For the generated amount of the abrasion powder, the qualitative judgment was performed, and the judgment results were classified into four levels X(E), Δ(D), ○(B) and ⊙(A) in accordance with the generated amount. The mark X(E) indicates a level having the largest generated amount of abrasion powder, and ⊙(A) indicates a level having the smallest generated amount of abrasion powder. The mark Δ(D) indicates a relatively large generated amount of abrasion powder, and mark ○(B) indicates a level having a relatively small generated amount of abrasion powder.

Sample 1 uses SK4-CSP defined by the JIS standards as the material of the arm. The SK4-CSP is the cold-rolled steel band for a spring, and the material hardness is about Hv300 to 500. This arm is subjected to the black dyeing treatment. In general, the black dyeing treatment comprises the steps of immersing the iron and steel component into the strong alkali aqueous solution at high temperature, and forming the black oxide film of iron oxide ($Fe_3O_4$). Furthermore, when the chromate treatment by chromic anhydride or potassium bichromate is also used, the corrosion resistance is enhanced, and this material is broadly used for components requiring the reflection prevention such as the camera components. The black dyeing treatment applied to the arm and fitting pin in the present embodiment includes this treatment.

On the other hand, for the fitting pin with which the arm of Sample 1 is engaged. SUS416BFS was used as the material. This material is the rod defined by JIS standard SUS416 among free-cutting stainless steel rods. Without any treatment, the material SUS416 of the fitting pin has a hardness lower than that of the material SK4 of the arm. In the present example, SUS416BFS is subjected to the thermal treatment of hardening. By this thermal treatment, the Vickers hardness of the fitting pin is about Hv300 to 500. That is, the material hardness of hardened/treated SUS416BFS is substantially equal to that of the material SK4 of the arm. Depending on the conditions of the hardening treatment, the material can be harder than SK4. Furthermore, this fitting pin is subjected to the black dyeing treatment. As described above, this black dyeing treatment is broadly used for components requiring the reflection prevention such as the camera components.

When Sample 1 described above underwent the 30000 times of operation tests, a large amount of abrasion powder was generated and judgment was X(E). The abrasion powder has a particle diameter of 10 μm or more, and the most part was generated from the SUS fitting pin as a counterpart. The larger the particle diameter of abrasion powder is, the larger the influence on the image quality becomes. Particularly the abrasion powder having a particle diameter exceeding 10 μm exerts an adverse influence on the image quality. When the arm on the sliding side is engaged with the fitting pin on the fixed side, the abrasion powder is generated. Particularly the arm of Sample 1 is subjected to only the black dyeing treatment, the sliding properties are not improved, and a large amount of abrasion powder is generated in the fitting pin as the counterpart.

Sample 2 is an arm similarly using SK4-CSP as the material, but the surface treatment is changed to a combination of chemical polishing and gold plating from the black dyeing. The chemical polishing treatment comprises the steps of immersing the metal component processed beforehand in the arm shape into the chemical polishing solution, and dissolving the surface to remove the burrs. The dimension change by the chemical polishing is the loss of about 1 to 2 μm. As the chemical polishing solution, CPL-100 manufactured by Mitsubishi Gas Chemical Co., Inc. is used, and the immersion time is about ten seconds at room temperature. In addition to the chemical polishing treatment, the surface of Sample 2 is plated with gold. The thickness is about 0.5 μm. By the gold plating, the surface hardness of the arm drops to about Hv50 to 80, and the arm has satisfactory sliding properties.

It is to be noted that for the fitting pin with which the arm of Sample 2 is engaged, SUS416BFS subjected to the hardening treatment is used similarly as Sample 1. Additionally, the fitting pin used as the counterpart of Sample 1 is subjected to the black dyeing treatment. On the other hand, the fitting pin as the counterpart of Sample 2 is subjected to the chemical polishing treatment.

As a result of 30000 durability tests performed with respect to Sample 2, the generated amount of abrasion powder remarkably decreased as compared with Sample 1 and the result was marked with ○(B). The particle diameter of the generated abrasion powder measured 10 μm or less. The judgment of the durability test indicates that the arm of Sample 2 has a level suitable for the component of the shutter for the digital camera.

Further different materials were used to prepare four types of test pieces subjected to different surface treatments, a predetermined sliding test was carried out with respect to the pieces, and an effect of surface treatment was qualitatively inspected. FIG. 5 is a schematic diagram showing a method of the sliding test. As shown, a test piece 11 and ball 12 are set, and the test piece 11 is slid left to right. The test piece is slid at a speed such that the piece reciprocates 100 times in a distance of 5 mm every minute. The operation was performed for ten minutes. It is to be noted that the test piece 11 corresponds to the arm and the ball 12 corresponds to the fitting pin. The ball 12 is fixed to a ball fixing jig 13, and a load of 50 g is applied.

FIG. 6 shows results of the sliding test. Sliding portions of the test piece and ball were observed using a scanning electronic microscope, and a shaved amount was qualitatively judged. The result is divided and represented in four stages X(E), Δ(D), ○(B) and ⊙(A). Mark X(E) indicates a largest shaved amount, and ⊙(A) is a level indicating a smallest shaved amount. Mark Δ(D) indicates that a relatively large amount of shavings are generated, and mark ○(B) is a level indicating the generation of a relatively small amount of shavings.

Four types of test pieces were prepared. As the materials, SPCC is used in addition to the above-described SK. SPCC is a cold-rolled steel plate. For SK, the test piece whose surface is subjected to the black dyeing treatment (FBC) is used. For SPCC, three types of test pieces plated with Pd, Au, Ni were prepared. On the other hand, for the ball corresponding to the fitting pin, SUS304 and SUJ-2 were used as the materials. SUS304 is stainless steel. SUJ-2 is a high-carbon chromium bearing steel material. For SUJ-2, materials whose surfaces were plated with Pd, Au, Ni were prepared. Combinations of these four types of test pieces 11 and five types of balls were used to carry out the sliding test shown in FIG. 5.

As apparent from a table of FIG. 6, the best result marked with ⊚(A) is obtained in the combination in which the gold plating is applied on the test piece side corresponding to the arm and the plating treatment is not applied on the ball side corresponding to the fitting pin. The test piece on the sliding side is plated with gold so as to lower the surface hardness, whereas the surface hardness of the ball on the fixed side holds the surface hardness in a high state. Such combination can prevent the abrasion from being generated. This sliding test result is applied to the arm and fitting pin in the present embodiment. That is, the arm on the sliding side is plated with gold so that the surface hardness is lowered and satisfactory sliding properties are achieved. On the other hand, the surface hardness of the fitting pin is kept to be higher than that of the arm, and the abrasion is prevented.

As described above, according to the first aspect of the present invention, the surfaces of an arm and fitting pin are smoothed, a surface hardness of the blade fitting pin is improved, and it is thereby possible to reduce the amount of abrasion powder generated by a shutter operation.

According to the second aspect of the present invention, the surfaces of the arm and fitting pin are smoothed by a chemical polishing treatment, further the surface of the blade fitting pin is plated with gold which has ductility and lubricating properties, and it is thereby possible to reduce the amount of abrasion powder generated by the shutter operation.

According to the third aspect of the present invention, the surfaces of the arm and fitting pin are smoothed by the chemical polishing treatment, further the surface of the arm is plated with gold which has the ductility and lubricating properties, and it is thereby possible to reduce the amount of abrasion powder generated by the shutter operation.

What is claimed is:

1. A focal plane shutter apparatus comprising: a light shielding blade; a fitting pin attached to the light shielding blade; and an arm which is slidably engaged with the fitting pin to open or close the light shielding blade, wherein a surface hardness of said fitting pin is higher than that of said arm, wherein said arm and fitting pin are treated with chemical polishing.

2. The focal plane shutter apparatus according to claim 1, wherein the surface hardness of said arm is a value selected within a range of Hv300 to Hv600, and the surface hardness of said fitting pin is a value selected within a range of Hv450 to Hv1000 that is higher than the selected surface hardness value for said arm.

3. The focal plane shutter apparatus according to claim 1, wherein said fitting pin is plated with nickel, chromium, palladium or rhodium.

4. The focal plant shutter apparatus according to claim 1, wherein a hardness of material beneath said surface of said fitting pin is equal to or higher than a hardness of material beneath said surface of said arm.

5. A focal plant shutter apparatus comprising: a light shielding blade; a fitting pin attached to the light shielding blade; and an arm which is slidably engaged with the fitting pin to open or close the light shielding blade,
wherein a material hardness of said fitting pin is equal to or higher than that of said arm,
said arm and said fitting pin are subjected to chemical polishing treatment, and
said fining pin is plated with gold.

6. A focal plane shutter apparatus comprising: a light shielding blade; a fitting pin attached to the light shielding blade; and an arm which is slidably engaged with the fitting pin to open or close the light shielding blade,
wherein a hardness of material forming said fitting pin beneath the surface thereof is equal to or higher than a hardness of material forming said arm,
said arm and said fining pin are treated with chemical polishing, and
said arm is plated with gold.

7. The focal plane shutter apparatus according to claim 6, wherein a surface hardness of said fitting pin is higher than that of said arm.

* * * * *